United States Patent
Murakami

(10) Patent No.: US 7,535,145 B2
(45) Date of Patent: May 19, 2009

(54) AXIAL AIR GAP-TYPE ELECTRIC MOTOR

(75) Inventor: Masanori Murakami, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 0 days.

(21) Appl. No.: 11/452,903

(22) Filed: Jun. 15, 2006

(65) Prior Publication Data

US 2006/0284507 A1 Dec. 21, 2006

(30) Foreign Application Priority Data

Jun. 16, 2005 (JP) ............................. 2005-176282

(51) Int. Cl.
*H02K 21/24* (2006.01)
(52) U.S. Cl. ............................. 310/156.08; 310/156.32; 310/268; 310/266; 310/156.37; 310/156.55
(58) Field of Classification Search ............ 310/156.08, 310/156.36, 156.37, 156.32, 32–37, 53, 55, 310/266

See application file for complete search history.

(56) References Cited

U.S. PATENT DOCUMENTS

| | | | |
|---|---|---|---|
| 4,814,654 | A | 3/1989 | Gerfast |
| 6,515,390 | B1 * | 2/2003 | Lopatinsky et al. ......... 310/178 |
| 6,940,200 | B2 * | 9/2005 | Lopatinsky et al. ......... 310/178 |
| 7,084,548 | B1 * | 8/2006 | Gabrys ....................... 310/268 |
| 7,187,098 | B2 * | 3/2007 | Hasebe et al. ........... 310/156.43 |
| 2003/0117032 | A1 * | 6/2003 | Komuro et al. ......... 310/156.08 |
| 2006/0284507 | A1 * | 12/2006 | Murakami ............. 310/156.37 |

FOREIGN PATENT DOCUMENTS

| | | |
|---|---|---|
| FR | 2 606 951 | 5/1988 |
| JP | 61-244250 | 10/1986 |
| JP | 2005-94955 A | 4/2005 |
| JP | 2005-143276 | 6/2005 |

OTHER PUBLICATIONS

Extended European Search Report from EP App. No. 06012434.4-1242, dated Jun. 26, 2007.

* cited by examiner

*Primary Examiner*—Quyen P Leung
*Assistant Examiner*—Naishadh N Desai
(74) *Attorney, Agent, or Firm*—Venable LLP; Michael A. Sartori; Steven J. Schwarz

(57) ABSTRACT

A rotor 31 has permanent magnets 31*a* disposed on a surface of a disk-shaped back yoke 31*b* in such a manner that long sides of each permanent magnet extend in a radial direction and that a South pole and a North pole of the permanent magnet 31*a* are arranged in a circumferential direction. The four permanent magnets 31*a* are equally spaced from one another in the circumferential direction, and circumferentially-opposed magnetic poles of any two adjacent permanent magnets 31*a* are of the same magnetic polarity. Rotor cores 31*c* of a generally fan-shape are fixed to the back yoke to generally cover the four permanent magnets 31*a*. A flux barrier 31*d* for reducing the short-cutting of magnetic flux of the permanent magnet 31*a* is provided between any two adjacent rotor cores 31*c*, and is disposed at a radially-extending central portion of the permanent magnet 31*a*.

3 Claims, 8 Drawing Sheets

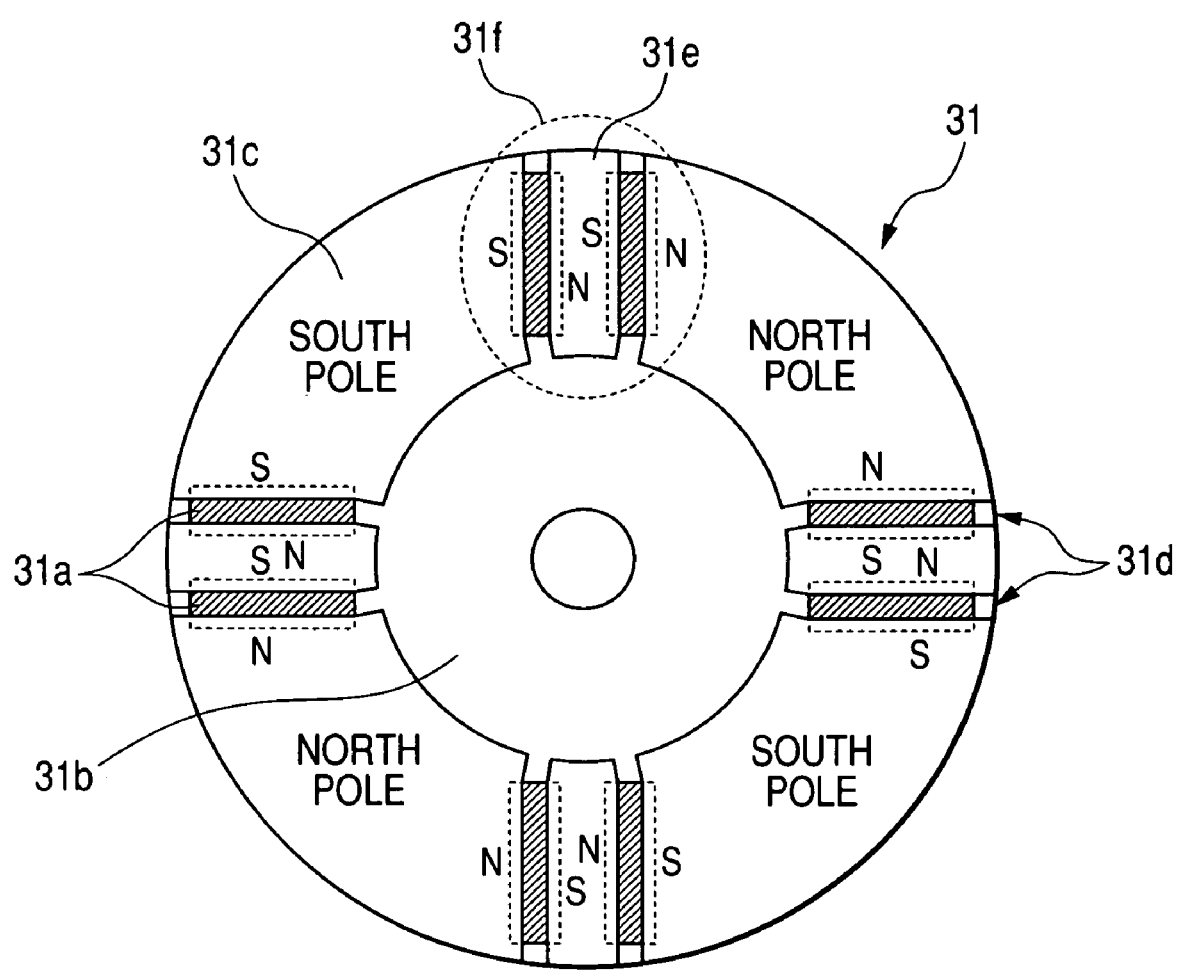

AXIAL AIR GAP-TYPE ELECTRIC MOTOR

BACKGROUND OF THE INVENTION

This invention relates to an axial air gap-type electric motor, and more particularly to the structure of permanent magnets and rotor cores provided at a rotor.

A conventional axial air gap-type electric motor has, for example, a structure shown in FIG. 8.

FIG. 8 is a cross-sectional view showing the overall construction of the basic axial air gap-type electric motor 90, and FIG. 9 shows a stator 92 of the axial air gap-type electric motor 90, and FIG. 9A is a perspective view of a stator core, and FIG. 9B is a front-elevational view of the stator core. FIG. 10 shows a rotor, and FIG. 10A is a perspective view of the rotor, and FIG. 10B is a side-elevational view of the rotor.

In the axial air gap-type electric motor 90, the rotor 94 is fixedly mounted on a rotation shaft 98 rotatably mounted on a casing 96, as shown in FIG. 8. As shown in FIG. 10, the rotor 94 has a cylindrical shape, and a plurality of permanent magnets 80 are provided in the rotor 94, and are arranged in a circumferential direction. The permanent magnets 80 are completely embedded in the rotor 94. The permanent magnets 80 are arranged to alternate in polarity (South and North poles) at each side of the rotor 94, that is, in a common plane.

On the other hand, the annular stators 92 are disposed within the casing 96, with the disk-shaped rotor 94 sandwiched therebetween. As shown in FIG. 9A, the stator 92 includes the stator core 92a as a main component, and a plurality of teeth 92a1 are formed on and project from that side (or face) of the stator 92 opposed to the rotor 94. A conductor (wire) is wound around each tooth 92a1 to form a coil 92b as shown in FIG. 9B, and when an electric current is cause to flow through each coil 92b, a magnetic pole is formed at the tooth 92a1. Namely, the stator 92 is formed by the stator core 92a and the coils 92b. Thus, in the axial air gap-type electric motor 90, the magnetic poles of the stator 92 are opposed to the permanent magnets 80 of the rotor 94 in a direction parallel to the rotation shaft 98.

When an electric current is caused to flow sequentially through the coils 92b, the teeth 92a1 are sequentially magnetized to form a rotating magnetic field. The permanent magnets 80 of the rotor 94 interact with the rotating magnetic field, and therefore attractive and repulsive effects develop to thereby rotate the rotor 94, so that a magnet torque can be obtained.

In the axial air gap-type electric motor 90, in order to obtain a reluctance torque in addition to the magnet torque developing because of the presence of the permanent magnets 80, magnetic components (ferromagnetic components) are provided respectively in predetermined portions of the rotor 94. These magnetic components are so arranged that they can be attracted by the magnetic poles sequentially formed at the stator 92 so as to rotate the rotor 94. More specifically, there are provided the eight magnetic components 84 each disposed between the corresponding two adjacent permanent magnets 80 so as to be attracted by the magnetic poles of the stator 92. The permanent magnets 80 are embedded in a rotor core 81.

As described above, the attractive and repulsive effects are produced by the interaction between the rotating magnetic field (produced at the stator 92) and the permanent magnets 80 of the rotor 94, so that the magnet torque develops in the rotor 94. Simultaneously with this operation, the magnetic components 84 are attracted by the teeth 92a1 magnetized by the rotating magnetic field produced at the stator 92, so that a reluctance torque is produced. Namely, in the axial air gap-type electric motor 90 provided with the above magnetic components 84, the sum of the magnet toque and the reluctance torque can be used as the motor torque.

Incidentally, the direction of the magnetic flux in the axial air gap-type electric motor 90 is parallel to the rotation shaft 98, and in the case where the magnetic component 84 is disposed between any two adjacent permanent magnets 80 as described above, an eddy current is produced in the magnetic component 84. The generation of such eddy current is the cause of an energy loss such as heating. Therefore, in order to suppress the generation of eddy currents, a dust core material is used to form the rotor 94, and by doing so, an electric resistance of each magnetic component 84 in a plane perpendicular to the magnetic flux is set to a high value (see, for example, Patent Literature 1).

However, the magnetic force faces of the permanent magnets of the rotor are opposed to the teeth faces of the stator, and therefore when such an electric motor is used for a long period of time or when a magnetic force of above a predetermined level is produced by the stator, there has been encountered a problem that a so-called demagnetization phenomenon, in which the magnetic forces of the permanent magnets are lowered, occurs, thus lowering the ability of the electric motor.

[Patent Literature 1]
JP-A-2005-94955 (Pages 5 to 6, FIG. 6)

SUMMARY OF THE INVENTION

It is therefore an object of this invention to solve the above problem and more specifically to provide an axial air gap-type electric motor having a rotor structure in which eddy currents are prevented, and besides a reluctance torque can be used efficiently, and furthermore demagnetization is less liable to occur.

The above object is achieved by an axial air gap-type electric motor including: a stator having a plurality of magnetic pole portions provided at a side face thereof and arranged in a circumferential direction, and a rotor which is disposed in opposed relation to the magnetic pole portions, and is spaced a predetermined distance from the magnetic pole portions, the rotor including a plurality of permanent magnet groups arranged in the circumferential direction, and each of the permanent magnet groups having at least one permanent magnet, wherein the permanent magnet groups are arranged so that their magnetic polarities are oriented in the circumferential direction of the rotor.

Preferably, opposed magnetic poles of any two circumferentially-adjacent permanent magnet groups are of the same magnetic polarity.

Preferably, each of the permanent magnet groups has at least two permanent magnets arranged in the circumferential direction, and opposed magnetic poles of the two circumferentially-adjacent permanent magnets are of opposite polarity.

Preferably, each of the permanent magnet groups has at least two permanent magnets arranged in a radial direction of the rotor, and the two permanent magnets are arranged to have the same magnetic polarity in the circumferential direction.

Preferably, any two adjacent permanent magnet groups are magnetically coupled to each other by a rotor core made of a ferromagnetic material.

Preferably, the rotor core has a flux barrier for preventing short-circuiting of magnetic fluxes produced by the permanent magnets.

In the axial air gap-type electric motor of the invention of aspect 1, the permanent magnet groups are arranged in such a manner that their magnetic polarities are oriented in the circumferential direction of the rotor. With this structure, magnetic forces of the permanent magnets are directed toward the magnet poles of the stator, and the permanent magnets themselves are not directly opposed to the magnetic poles of the stator, and therefore demagnetization can be reduced as compared with the conventional structure in which the permanent magnets are directly opposed to the magnetic poles of the stator.

In the invention of aspect 2, the opposed magnetic poles of any two circumferentially-adjacent permanent magnet groups are of the same magnetic polarity. With this structure, magnetic forces of the circumferentially-adjacent permanent magnet groups can be used in combination with each other.

In the invention of aspect 3, each of the permanent magnet groups has at least two permanent magnets arranged in the circumferential direction, and the opposed magnetic poles of the two circumferentially-adjacent permanent magnets are of opposite polarity. With this structure, eddy currents can be reduced, and besides a reluctance torque can be enhanced.

In the invention of aspect 4, each of the permanent magnet groups has at least two permanent magnets arranged in a radial direction of the rotor, and the two permanent magnets are arranged to have the same magnetic polarity in the circumferential direction. With this structure, the eddy currents can be further reduced than in the structure of aspect 3, and besides the reluctance toque can be enhanced.

In the invention of aspect 5, the adjacent permanent magnet groups are magnetically coupled to each other by the rotor core made of the ferromagnetic material. With this structure, the magnetic forces can be efficiently used, and besides the reluctance torque, produced by the rotor cores, can be enhanced.

In the invention of aspect 6, the rotor core has the flux barrier for preventing the short-circuiting of magnetic fluxes produced by the permanent magnets, and therefore the short-circuiting of the magnetic fluxes at the magnetic poles of the permanent magnets is prevented, so that the efficiency of the electric motor can be enhanced.

BRIEF DESCRIPTION OF THE DRAWINGS

FIG. 4 shows a modified rotor structure of the axial air gap-type electric motor of the invention, wherein

FIG. 5 is a front-elevational view showing another modified rotor structure of the axial air gap-type electric motor of the invention.

FIG. 6 shows a 12-pole rotor structure of the invention, wherein

FIG. 9 shows a stator of the conventional axial air gap-type electric motor, wherein

FIG. 10 shows a rotor of the conventional axial air gap-type electric motor, wherein

DETAILED DESCRIPTION OF THE PREFERRED EMBODIMENTS

Preferred embodiments of the present invention will now be described in detail with reference to the accompanying drawings.

First Embodiment

Figure 1:
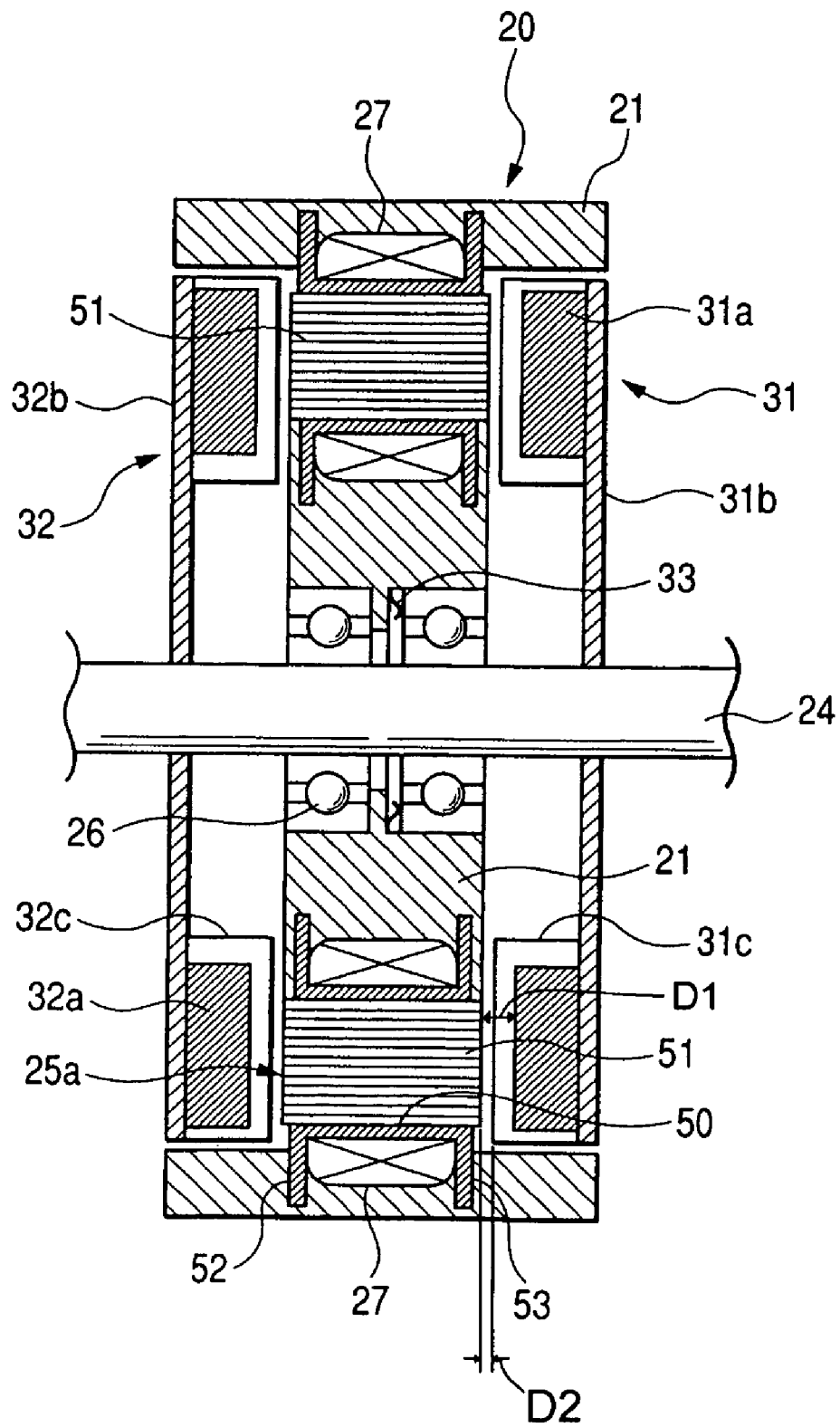
FIG. 1 is a cross-sectional view showing a preferred embodiment of an axial air gap-type electric motor of the present invention.

FIG. 1 is a cross-sectional view showing one preferred embodiment of an axial air gap-type electric motor of the invention.

As shown in FIG. 1, this axial air gap-type electric motor includes a generally ring-shaped stator 20, and a pair of disk-like rotors 31 and 32 disposed in opposed relation respectively to opposite sides of the stator 20, with a predetermined gap formed between each rotor 31, 32 and the stator 20. The two rotors 31 and 32 are mounted on a common rotation shaft 24, and the stator 20 has bearing portions 26 provided at its inner peripheral portion, the bearing portions 26 supporting the rotation shaft 24.

Figure 2:
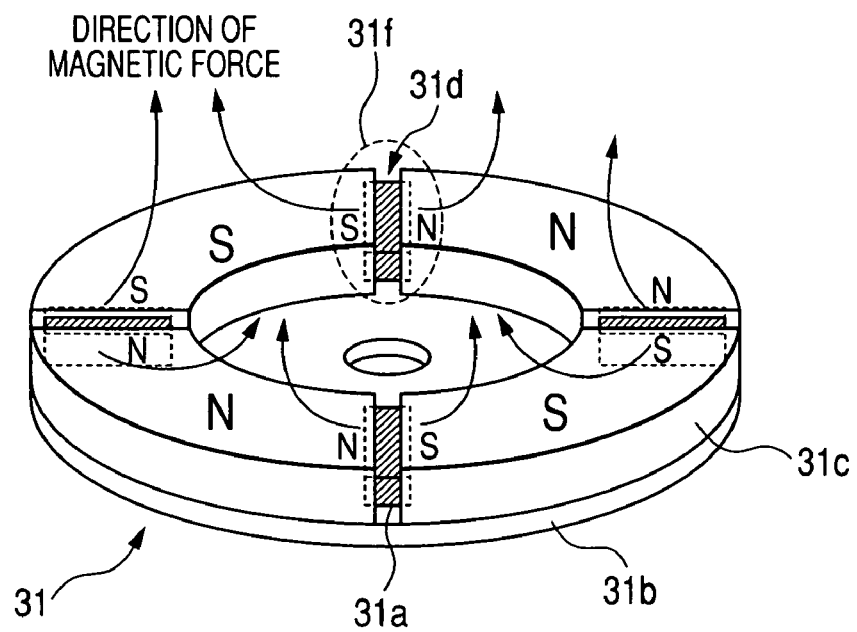
FIG. 2 is a perspective view showing a rotor structure of the axial air gap-type electric motor of the invention.

As shown in FIG. 2, the rotor 31 includes four permanent magnets 31*a* which are provided in an inner surface thereof, and are spaced from one another in a circumferential direction. The rotor 32 is totally identical in structure to the rotor 31, and therefore its explanation will be omitted.

Actually, the stator 20 and the rotors 31 and 32 are received within a bracket (box-like member) which is not shown, and the stator 20 is fixed at its outer peripheral potion to this bracket.

As shown in FIG. 1, the stator 20 is molded into an annular shape, using a synthetic resin, and this stator 20 has the bearing portions 26 inserted coaxially in its inner peripheral portion.

Six core members 25*a* are provided in the stator 20, and are connected together in an annular shape. Therefore, the electric motor of this embodiment is a so-called 4-pole 6-slot electric motor. All of the core members 25*a* have the same shape. Each of the core members 25*a* has a tooth (iron core) 51 formed by laminating a plurality of metal sheets into a trapezoidal shape, and an insulator 50 made of a synthetic resin is formed integrally around the tooth 51 except opposite side surfaces thereof. One core member 25*a* serves as one magnetic pole portion of the stator 20.

Each of the insulators 50 includes a pair of left and right flanges 52 and 53 of a generally fan-shape disposed respectively along the opposite side surfaces of the tooth 51, and the insulator 50 has a bobbin-like shape with a H-shaped cross-section as a whole. A coil 27 is wound around the insulator 50, and is disposed between the two flanges 52 and 53.

The core members 25*a* are fixed at their inner and outer peripheries by the synthetic resin 21 by insert molding. A ring-like plate spring (wavy washer spring) 33 is provided between one side of an inner peripheral portion of the stator 20 and the bearing portion 26.

The rotors 31 and 32 are disposed respectively at the opposite sides (or faces) of the cylindrical stator 20, and these rotors are fixed to the rotation shaft 24. Four rectangular permanent magnets 31*a*, 32*a* of the same size are provided in the inner face of each rotor 31, 32 opposed to the teeth 51 of the stator 20. This rotor is of the 4-pole type, and therefore a group of permanent magnet, forming one pole among these poles, will be referred to as a permanent magnet group. There are occasions when one permanent magnet group includes a plurality of permanent magnets as described later.

FIG. 2 is a perspective view showing the structure of the rotor. This rotor 31 includes the permanent magnets 31*a* (each including a rare-earth magnet of a square shape) which are fixed by an adhesive to a surface of a disk-like back yoke 31*b* (made of a non-magnetic material) in such a manner that long sides of each permanent magnet 31*a* extend in a radial direction and that a South pole and a North pole of the permanent magnet 31*a* are arranged in a circumferential direction. The four permanent magnets 31*a* are equally spaced from one another in the circumferential direction, and the circumferentially-opposed magnetic poles of any two adjacent permanent magnets 31*a* are of the same magnetic polarity. In this case, one permanent magnet group 31*f* includes one permanent magnet 31*a*, and therefore the magnetic polarity of the permanent magnet group 31*f* is the same as the magnetic polarity of the permanent magnet 31*a*. The back yoke 31*b* is formed, using the non-magnetic material, and therefore magnetic fluxes of the permanent magnets 31*a* can be directed toward the teeth 51 of the stator 20 without being affected by the back yoke 31*b*. If adverse effects of the back yoke 31*b* are little, the back yoke 31*b* may be made, for example, of a steel plate.

Generally fan-shaped rotor cores 31*c*, made of a ferromagnetic material, are fixed by an adhesive to the back yoke 31*b* in such a manner that each rotor core 31*c* mechanically and magnetically couples the adjacent permanent magnets 31*a* to each other. Notches are formed respectively in circumferentially-opposite ends of each fan-shaped rotor core 31*c*, and the circumferentially-opposed end portions of the adjacent permanent magnets 31*a* are fitted respectively in these notches. Therefore, the circumferentially-opposite end portions of each permanent magnet 31*a* are held respectively by the circumferentially-opposed end portions of the adjacent rotor cores 31*c*, and with this structure the permanent magnets 31*a* are prevented from being disengaged from the rotor under the influence of a centrifugal force.

With this structure, a groove is formed between any two adjacent rotor cores 31*c*, and is disposed at a radially-extending central portion of the corresponding permanent magnet 31*a*. This groove serves as a flux barrier 31*d* for reducing the short-cutting of the magnetic flux of the permanent magnet 31*a*. Instead of providing these grooves, a material of a low magnetic permeability, such as a synthetic resin and aluminum, can be used. The axial distance between the permanent magnets 31*a*, 32*a* and the respective core member 25*a* along the direction of the rotation shaft 24 can be longer than the axial distance between the rotor cores 31*c*, 32*c* and the respective core member 25*a* along the direction of the rotation shaft 24, as shown in FIG. 1. For example, as designated in the lower right-hand corner of FIG. 1, the axial distance D1 between the permanent magnet 31*a* and core member 25*a* can be longer than the axial distance D2 between the rotor core 31*c* and the core member 25*a*.

This rotor core 31*c* is made of a dust core material composed of fine powder particles of a ferromagnetic material (such as iron) each having an electrically non-conductive coating formed thereon, and the powder particles are compacted to form the rotor core 31*c*. The rotor core 31*c*, made of the dust core material, allows the magnetic flux to pass therethrough in three-dimensional directions, but hardly allows electric current to pass therethrough, and therefore the rotor core 31*c* has a feature that this rotor core 31*c*, even when subjected to a magnetic field generated from the stator 20, will not allow eddy current to flow therethrough.

As described above, the opposed magnetic poles of any two adjacent ones of the four permanent magnet groups 31*f* (which are circumferentially equally spaced from one another) are of the same magnetic polarity, and therefore the magnetic polarity of each of the rotor cores 31 is determined by the magnetic polarity of the opposed magnetic poles of the two adjacent permanent magnet groups 31*f*. For example, in FIG. 2, the four rotor cores 31*c* have a North pole, a South pole, a North pole and a South pole respectively in the clockwise sequence from the upper side. Therefore, with respect to the upper central permanent magnet group 31*f* (that is, the permanent magnet 31*a*) in FIG. 2, it produces a North-pole magnetic force from the right side, and also produces a South-pole magnetic force from the left side, and these magnetic forces are directed upwardly (that is, toward the teeth faces of the stator) through the rotor cores 31*c*.

Thus, the magnetic forces of the permanent magnet groups 31*f* (the permanent magnets) are directed toward the teeth 51 of the stator 20 through the rotor cores 31*c*, and therefore demagnetization can be reduced as compared with the conventional structure in which the permanent magnets are directly opposed to the teeth 51.

And besides, this structure provides saliency by the use of the rotor cores 31*c*, and therefore in addition to the magnet torque produced because of the presence of the permanent magnets 31*a*, a reluctance torque in the rotor cores 31*c* can be used, and therefore the range of operation (i.e., the number of revolution) of the electric motor can be increased.

Figure 3:
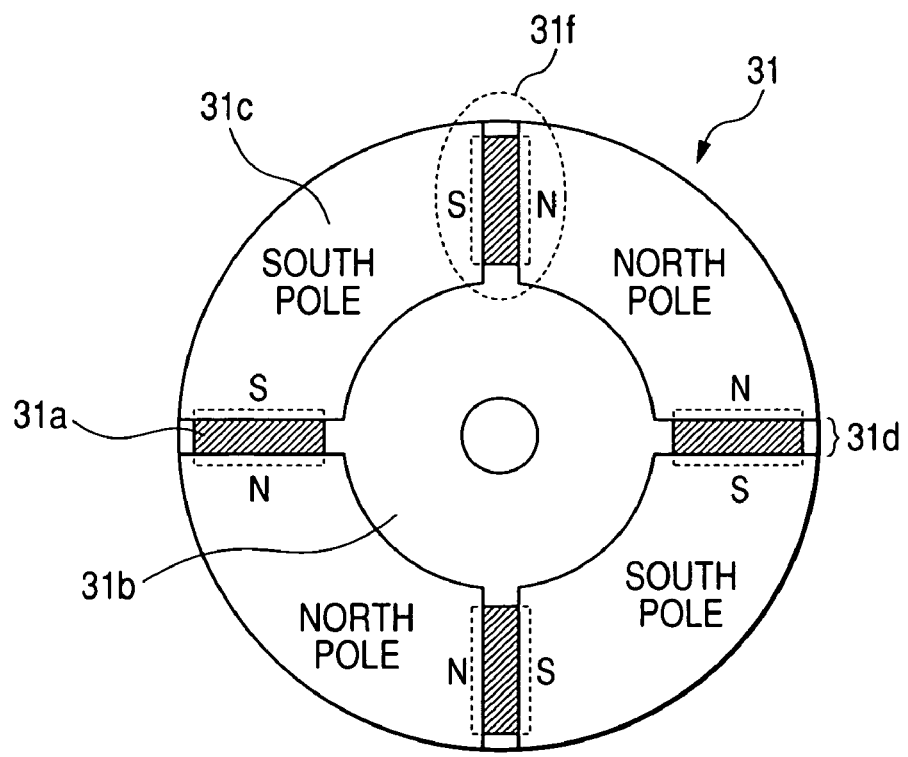
FIG. 3 is a front-elevational view showing the rotor structure of the axial air gap-type electric motor of the invention.
Figure 4A:
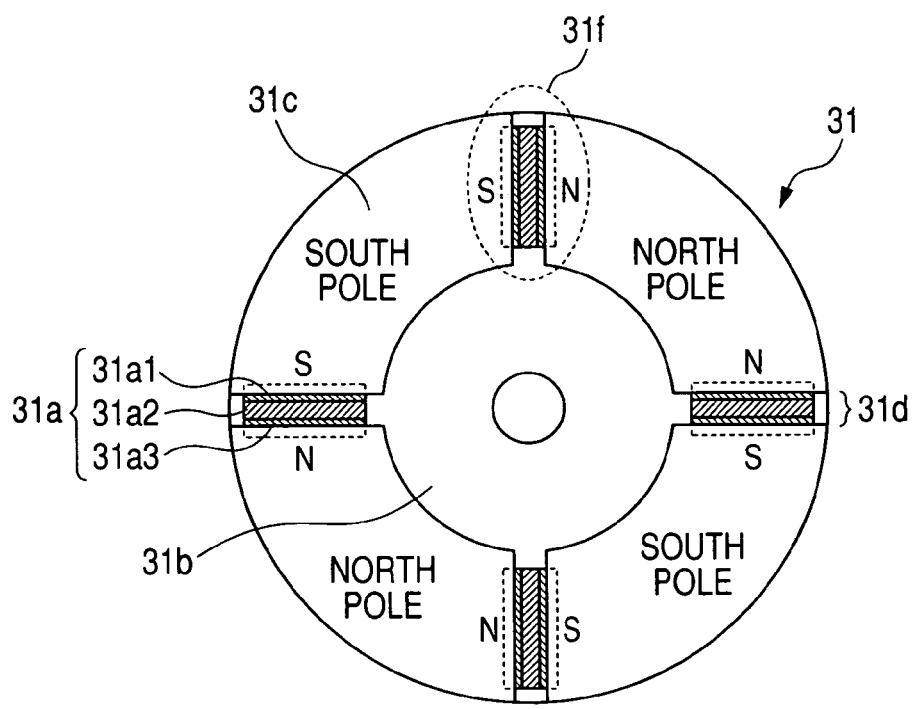
FIG. 4A is a front-elevational view.

FIG. 3 is a view of the rotor of FIG. 2 as seen from the front side thereof. FIG. 4A shows a modified example of the rotor structure of FIG. 3. Those portions, having the same functions as those of FIG. 3, will be designated by identical reference numerals, respectively, and detail explanation thereof will be omitted.

The rotor of this embodiment differs from the rotor of FIG. 3 in the structure of permanent magnets 31*a*. Although each permanent magnet 31*a* of FIG. 3 is formed to have the single rectangular body, each permanent magnet 31*a* of FIG. 4A includes three permanent magnets 31*a*1, 31*a*2 and 31*a*3 laminated and bonded together in a circumferential direction of the rotor by an adhesive.

Figure 4B:
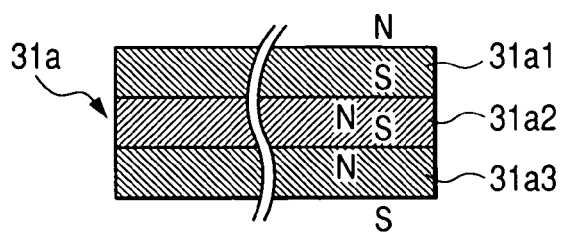
FIG. 4B is a front-elevational view showing a laminate structure of a permanent magnet.

FIG. 4B is an enlarged view showing the permanent magnet 31*a* of FIG. 4A. The three permanent magnets 31*a*1, 31*a*2 and 31*a*3 are magnetized in a circumferential direction of the rotor, and adjacent surfaces of any two adjacent permanent magnets, bonded to each other, are of opposite magnetic polarity. Therefore, the permanent magnet 31*a*, which is formed into an unitary form by bonding the three permanent magnets together, has the same magnetic polarity as the permanent magnet 31*a* of FIG. 3 in the circumferential direction.

By thus combining the plurality of permanent magnets into the single permanent magnet, eddy currents, flowing in a direction perpendicular to magnetic forces, can be reduced, and as a result heat, generated by eddy currents developing in the permanent magnets, can be reduced. Therefore, even in the case of using the rare earth magnets which can be easily affected by heat, the electric motor of a high efficiency can be produced. And besides, the enhancement of a reluctance torque due to the division of the permanent magnet can be expected, and therefore the efficiency of the electric motor can be enhanced.

Figure 4C:
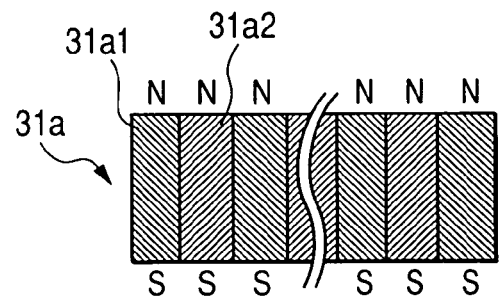
FIG. 4C is a front-elevational view showing another laminate structure of a permanent magnet.

FIG. 4C is an enlarged view showing a permanent magnet 31a of a different structure. This permanent magnet 31a differs from the permanent magnet 31a of FIG. 4A in the arrangement of magnets. The permanent magnet 31a of FIG. 4C includes a plurality of permanent magnets 31a1 and 31a2 which are alternately arranged in a radial direction of the rotor, and are laminated and bonded together.

Therefore, as compared with the permanent magnet 31a of FIG. 4B, the permanent magnet 31a of FIG. 4C has a larger number of magnets although the two permanent magnets have the same volume, and therefore eddy currents, flowing in a direction perpendicular to the magnetic forces, can be further reduced.

FIG. 5 is shows a further modified example of the rotor structure of FIG. 3. Those portions, having the same functions as those of FIG. 3, will be designated by identical reference numerals, respectively, and detail explanation thereof will be omitted.

In a rotor 31 of FIG. 5, each of permanent magnet groups 31f (corresponding respectively to the permanent magnet groups 31f of the rotor 31 of FIG. 3) includes two permanent magnets 31a, and the two permanent magnets 31a are spaced a predetermined distance in a circumferential direction, and are fixed in this condition. Circumferentially-opposed end portions of the two permanent magnets 31a are covered respectively with end portions of a rotor core 31e. In this case, also, each rotor core 31e has flux barriers 31d disposed respectively at the opposite ends thereof, and has notches for fitting respectively on the corresponding permanent magnets 31a as is the case with the rotor core 31c.

In FIG. 5, the two opposed permanent magnets 31a are arranged in spaced relation to each other such that opposed magnetic poles of these permanent magnets 31a are of opposite polarity. Therefore, the permanent magnet group 31f of FIG. 5 has the same magnetic polarity as the permanent magnet group 31f of FIG. 3.

In this structure, also, the reduction of eddy currents and the enhancement of a reluctance torque can be achieved, and the efficiency of the electric motor can be enhanced. And besides, as compared with the rotor core of FIG. 3, each rotor core of FIG. 5 includes two rotor cores, that is, the rotor core 31c and the rotor core 31e, and therefore eddy current, developing in the rotor core, can be further reduced.

FIG. 6 shows a further modified example of the rotor structure of FIG. 3, and this modified rotor 31 is of the 12-pole type. Those portions, having the same functions as those of FIG. 3, will be designated by identical reference numerals, respectively, and detail explanation thereof will be omitted.

Figure 6A:
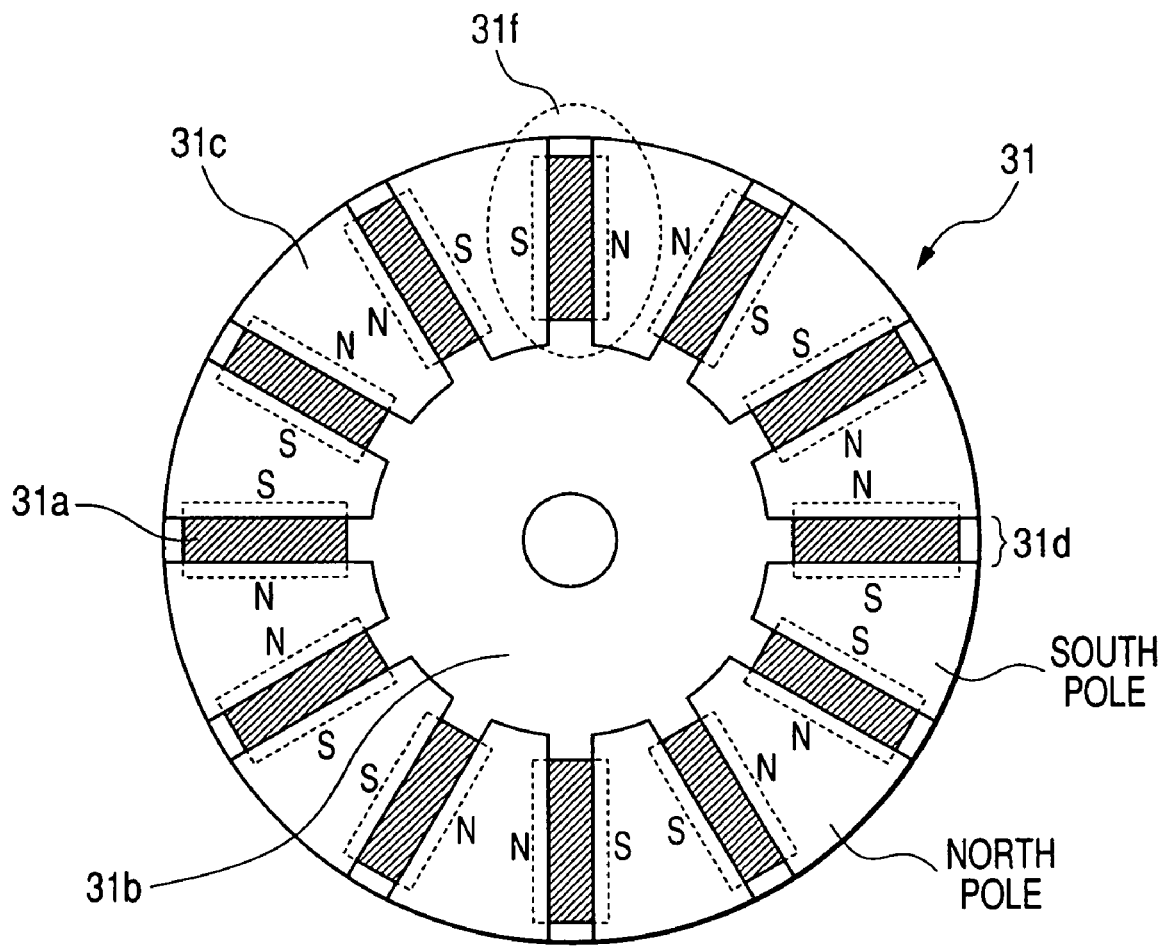
FIG. 6A is a front-elevational view.

In FIG. 6A, the rotor 31 includes twelve permanent magnets 31a and twelve rotor cores 31c which are arranged alternately in a circumferential direction of a back yoke 31b, the permanent magnets 31a, as well as the rotor cores 31c, being circumferentially equally spaced from one another. The permanent magnets 31a of permanent magnet groups 31f are arranged in such a manner that opposed magnetic poles of any two adjacent permanent magnet groups 31f are of the same magnetic polarity. Flux barriers 31d are provided respectively at opposite ends of each rotor core 31c. This 12-pole rotor 31 is used, for example, in combination with a stator 20 having 18-slot magnetic poles.

When the structure of the invention is thus applied to the multi-pole rotor, the torque is enhanced because of the increased number of permanent magnets 31a. And besides, the size of the rotor core 31c is relatively reduced, and therefore eddy current, developing in the rotor core 31c, can be reduced.

Figure 6B:
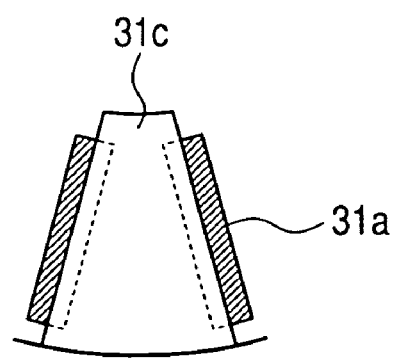
FIG. 6B is a view of a portion of the rotor structure, showing a modified example of rotor core formed of electromagnetic steel sheets.

FIG. 6B is a view of a portion of the rotor structure, showing a modified example of the rotor core 31c of FIG. 6A, the modified rotor core being made of a different material. The rotor core 31c of FIG. 6B is not made of the above-mentioned dust core material, but is formed by laminating electromagnetic steel sheets together in a radial direction of the rotor. With this structure, eddy currents of magnetic fluxes, passing through an air gap between each rotor and a stator can be reduced. And besides, the magnetic flux is less liable to be saturated, and therefore the efficiency of the electric motor can be enhanced. Furthermore, this structure is excellent in strength. Therefore, this structure is suited for an electric motor of a large size.

Next, the structure of rotor cores 31c, permanent magnets 31a and a back yoke 31b will be described with reference to side-elevational and cross-sectional views of FIG. 7. FIGS. 7A to 7F show different embodiments, respectively, and FIGS. 7A' to 7F' are cross-sectional views taken respectively along the lines A-A' to F-F. In FIGS. 7A to 7F, the left side is the outer periphery side of the rotor, while the right side is the inner periphery side of the rotor. Therefore, in FIGS. 7A' to 7F', a left-right direction is a circumferential direction. The permanent magnets 31a are provided on the back yoke 31b in such a manner that a longitudinal axis of each permanent magnet 31a extends in a radial direction of the back yoke 31b.

Figure 7A:
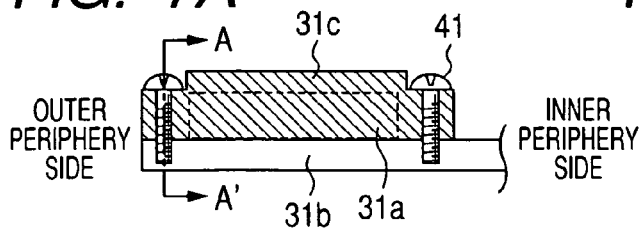
FIGS. 7A to 7F are side-elevational views showing rotors of different structures, respectively, and FIGS. 7A' to 7F' are cross-sectional views taken respectively along the lines A-A' to F-F' of FIGS. 7A to 7F.
Figure 7A:
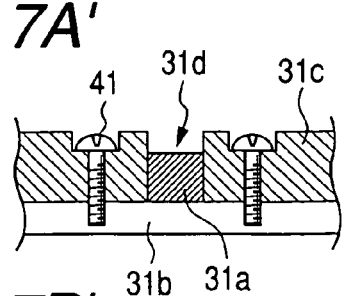

In FIGS. 7A and 7A', circumferentially-opposite end portions of each permanent magnet 31a are fitted respectively in notches formed respectively in opposed ends of the two adjacent rotor cores 31c (Each of the rotor cores 31c has the notches formed respectively in the circumferentially-opposite ends thereof.). The two rotor cores 31c are fastened to the back yoke 31b by screws 41, thereby fixing the permanent magnet 31a. Each rotor core 31c has recesses so that heads of the screws 41 are disposed at a level below the surface of the rotor core 31c. With this structure, the permanent magnet 31a and the rotor cores 31c can be firmly fixed to each other. And besides, thanks to the use of the screws 41, disassembling and assembling operations can be easily carried out.

Figure 7B:
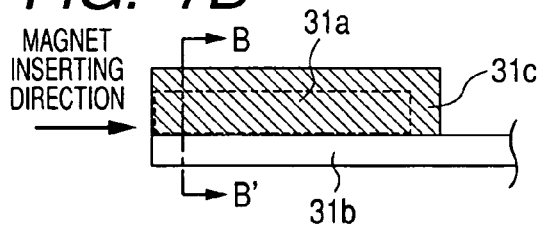
Figure 7B:
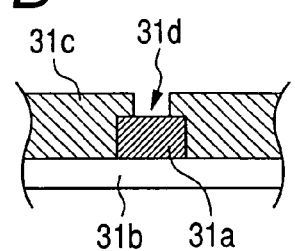

In FIGS. 7B and 7B', circumferentially-opposite end portions of each permanent magnet 31a are fitted respectively in notches formed respectively in opposed ends of the two adjacent rotor cores 31c (Each of the rotor cores 31c has the notches formed respectively in the circumferentially-opposite ends thereof.). The two rotor cores 31c are fixed to the back yoke 31b by an adhesive, thereby fixing the permanent magnet 31a. An insertion port, corresponding in cross-section and size to the permanent magnet 31a, is formed in an outer periphery-side surface of the rotor core 31c at each end portion thereof, and the permanent magnet 31a, having an adhesive coated thereon, is inserted from the left side (the outer periphery side) of FIG. 7B between the two rotor cores 31c through the insertion ports of these rotor cores 31c, so that the permanent magnet 31a is fixed. In this structure, each permanent magnet 31a is inserted from the outer periphery of the rotor, and therefore the rotor-producing operation can be carried out easily.

Figure 7C:
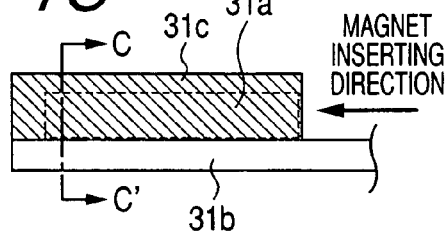
Figure 7C:
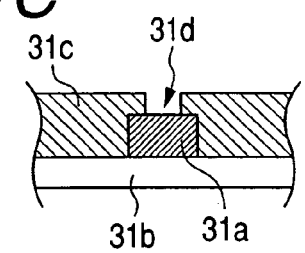

In FIGS. 7C and 7C', circumferentially-opposite end portions of each permanent magnet 31a are fitted respectively in notches formed respectively in opposed ends of the two adjacent rotor cores 31c (Each of the rotor cores 31c has the notches formed respectively in the circumferentially-opposite ends thereof.). The two rotor cores 31c are fixed to the back yoke 31b by an adhesive, thereby fixing the permanent magnet 31a. An insertion port, corresponding in cross-section and size to the permanent magnet 31a, is formed in an inner periphery-side surface of the rotor core 31c at each end portion thereof, and the permanent magnet 31a, having an adhesive coated thereon, is inserted from the right side (the inner periphery side) of FIG. 7C between the two rotor cores 31c through the insertion ports of these rotor cores 31c, so that the permanent magnet 31a is fixed. Only a gap, defining a flux barrier 31d, is provided in the outer periphery-side surfaces of the two rotor cores 31c, and this gap is smaller than the transverse cross-sectional area of the permanent magnet 31a. Therefore, there is provided retaining structure that prevents the permanent magnet 31a from being withdrawn from the outer periphery side of the rotor.

In this structure, the permanent magnet 31a is inserted from the inner periphery side of the rotor, but will not be withdrawn from the outer periphery side of the rotor. Therefore, there is no risk that any permanent magnet 31a flies out under the influence of a centrifugal force during the rotation of the rotor. Therefore, the reliability of the electric motor can be enhanced.

Figure 7D:
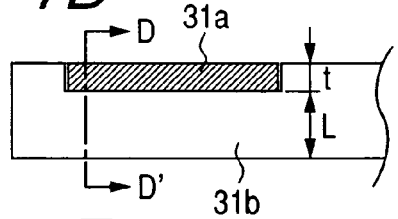
Figure 7D:
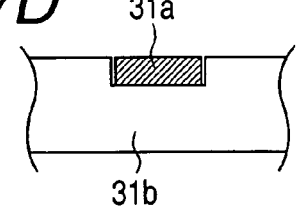

In FIGS. 7D and 7D', recesses are formed in the surface of the back yoke 31b, and permanent magnets 31a are embedded respectively in these recesses, and are fixed thereto by an adhesive. In this structure, any rotor core is not used, and therefore in order to efficiently use magnetic forces of the permanent magnets 31a, it is necessary that a thickness L of the back yoke 31b in a direction of the rotation axis should be made sufficiently larger than a thickness t of each permanent magnet 31a in the direction of the rotation axis. With this structure, rotor cores are saved, thereby reducing the cost, and besides the thickness of the rotor in the direction of the rotation axis can be reduced, so that the electric motor can be formed into a thin design. Furthermore, the permanent magnets 31a are embedded in the back yoke 31b, and therefore there is little risk that any permanent magnet 31a flies out under the influence of a centrifugal force during the rotation of the rotor.

Figure 7E:
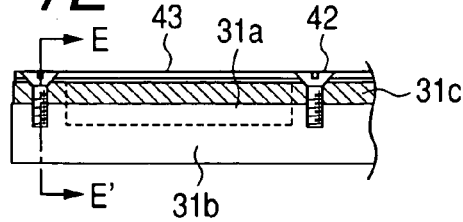
Figure 7E:
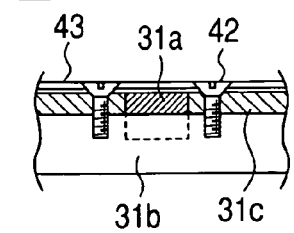

In FIGS. 7E and 7E', recesses are formed in the surface of the back yoke 31b, and lower portions of the permanent magnets 31a are embedded in these recesses, respectively. After the permanent magnets 31 are located respectively in the recesses, the rotor cores 31c (each having the same thickness as the thickness of that portion of each permanent magnet 31a projecting from the surface of the back yoke 31b in a direction of the rotation axis) are placed on the surface of the back yoke 31b. Then, a thin fixing plate 43, made of a non-magnetic material, is put on the rotor cores 31c and the permanent magnets 31a to cover them, and then is fastened to the back yoke 31b by flat-head screws 42. With this structure, the thickness of the rotor in the direction of the rotation axis can be reduced although the rotor cores 31c are used. And besides, the permanent magnets 31a and the rotor cores 31c can be firmly fixed to each other. Furthermore, the permanent magnets 31a are embedded in the back yoke, and therefore there is little risk that any permanent magnet 31a flies out under the influence of a centrifugal force during the rotation of the rotor.

Figure 7F:
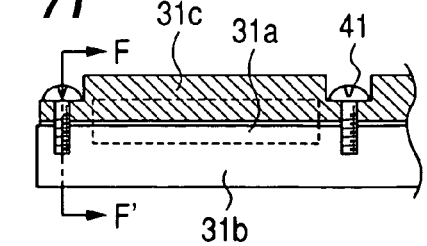
Figure 7F:
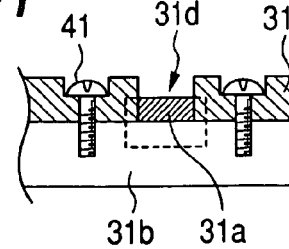
Figure 8:
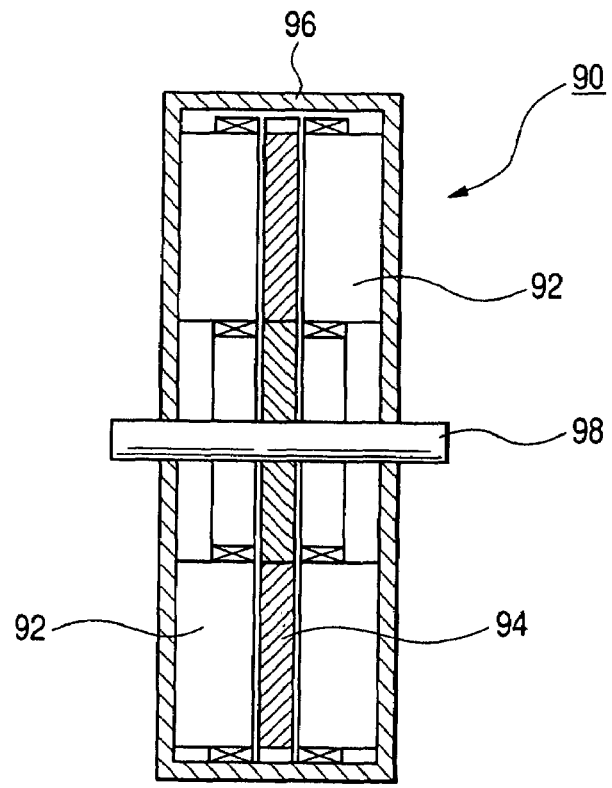
FIG. 8 is a cross-sectional view showing a conventional axial air gap-type electric motor.
Figure 9A:
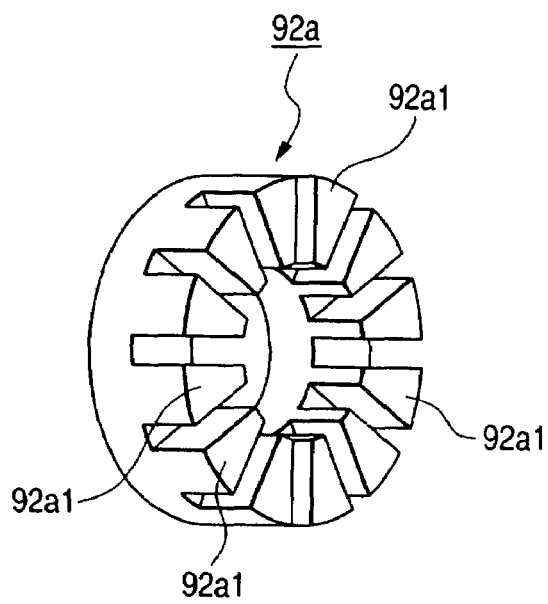
FIG. 9A is a perspective view showing a stator core.
Figure 9B:
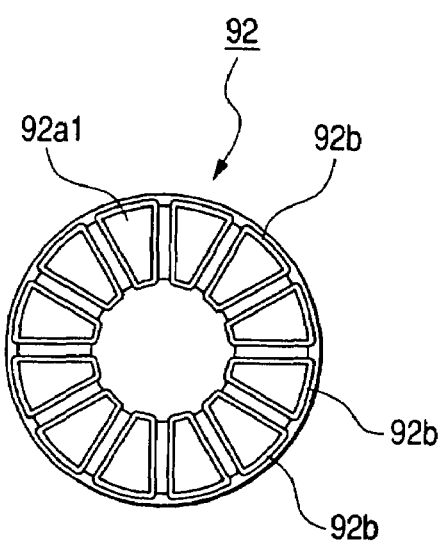
FIG. 9B is a front-elevational view of the stator core.

In FIGS. 7F and 7F', recesses are formed in the surface of the back yoke 31b, and lower portions of the permanent magnets 31a are embedded in these recesses, respectively. On the other hand, each of the rotor cores 31c has notches (for fitting respectively on circumferentially-opposed end portions of the two adjacent permanent magnets 31a) formed respectively in circumferentially-opposite ends thereof. After each permanent magnets 31a is located in the recess in the back yoke 31b, the two adjacent rotor cores 31c are fastened to the back yoke 31b by screws 41, thereby fixing the permanent magnet 31a. Each rotor core 31c has recesses so that heads of the screws 41 are disposed at a level below the surface of the rotor core 31c. With this structure, a material for the rotor core 31c can be saved, and besides the thickness of the rotor in the direction of the rotation axis can be reduced.

In the embodiments of FIG. 7, whether to use the screws or the adhesive is at discretion, and in each of the above structures, the screws can be replaced by the adhesive, and vice versa, or the screws and the adhesive can be used in combination. In the above description, although the rotor cores 31c are made of the dust core material, the rotor cores are not limited to this material, and each rotor core 31c can be formed of laminated magnetic steel sheets as described above in FIG. 6B.

The invention is not limited to the above electric motors having the rotors with the four magnetic poles or the twelve magnetic poles, but can be extensively applied to axial air gap-type electric motors with a desired number of magnetic poles.

Furthermore, the invention is not limited to the stator configuration of the above embodiments, and the advantages of the invention can also be achieved even with the type of stator having no iron core.

In the above embodiments, although the bearing portions 26 are provided within the stator 20, the invention is not limited to this construction, and for example bearing portions can be provided respectively at opposite end portions of the bracket (not shown).

In the above embodiments, although the two rotors 31 and 32 are mounted on the common rotation shaft 24, the electric motor can have only one rotor.

In another alternative, the two rotors 31 and 32 can be fixedly mounted on different rotation shafts, respectively. Furthermore, the electric motor may be of the shaftless type with no rotation shaft 24, in which the two rotors 31 and 32 are directly supported on the stator 20 through radial bearings.

FIGURE LEGENDS

Figure 10A:
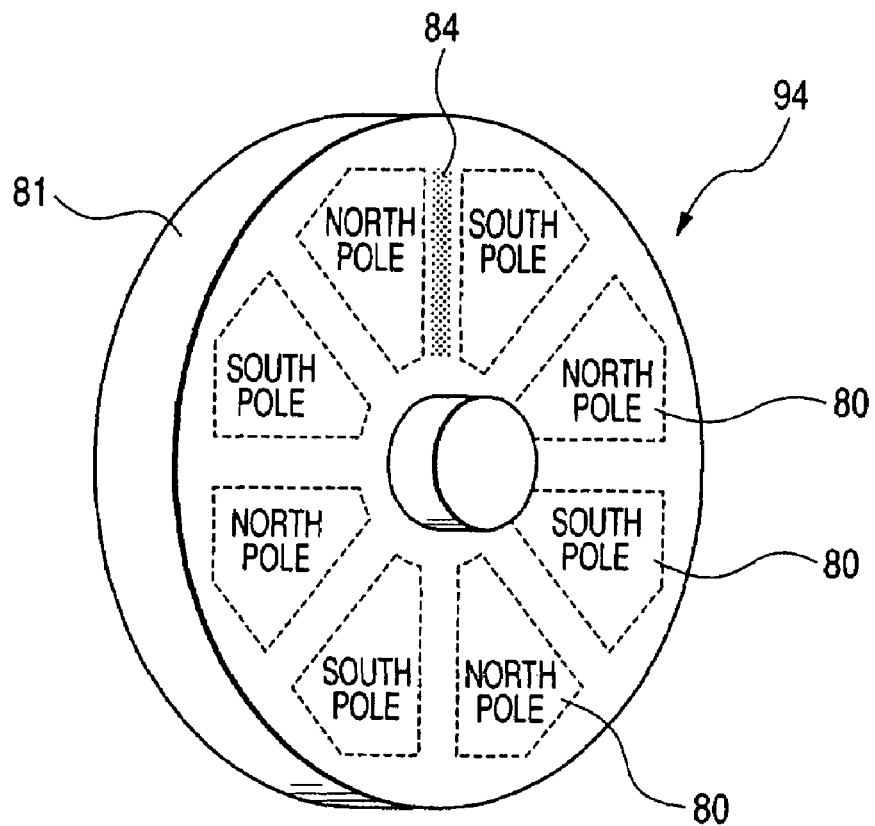
FIG. 10A is a perspective view.
Figure 10B:
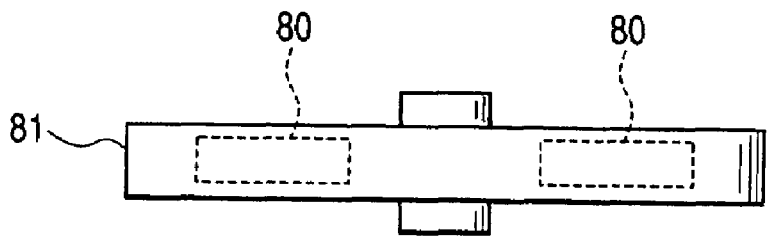
FIG. 10B is a side-elevational view.

[FIG. 2]
A1: direction of magnetic force
[FIG. 3]
A1: South pole
A2: North pole
[FIG. 4A]
A1: South pole
A2: North pole
[FIG. 5A]
A1: South pole
A2: North pole
[FIG. 6A]
A1: South pole
A2: North pole
[FIG. 7A]
A1: outer periphery side
A2: inner periphery side
[FIG. 7B]
A1: magnet inserting direction
[FIG. 7C]
A1: magnet inserting direction
[FIG. 10A]
A1: South pole
A2: North pole

What is claimed is:
1. An axial air gap-type electric motor comprising:
a stator having a plurality of magnetic pole portions provided at a side face thereof and arranged in a circumferential direction, and
a rotor which is disposed in opposed relation to the magnetic pole portions, and is spaced a predetermined dis- tance from the magnetic pole portions, the rotor including a plurality of rotor cores and permanent magnet groups arranged in the circumferential direction, each of the rotor cores made of magnetic material and each of the permanent magnet groups having at least one permanent magnet, wherein the permanent magnet groups are arranged in such a manner that each permanent magnet has its magnetic polarity oriented in the circumferential direction of the rotor, opposed magnetic poles of any two circumferentially-adjacent permanent magnet groups are of the same magnetic polarity, an axial distance between each permanent magnet and the respective magnetic pole portion along a rotation shaft direction is longer than an axial distance between the respective rotor core and the respective magnetic pole portion along the rotation shaft direction, the rotor includes a disk-like non-magnetic material, and the rotor core and the permanent magnet groups are mounted on the disk-like non-magnetic material so that magnetic fluxes of the permanent magnet are directed only toward the stator.

2. An axial air gap-type electric motor comprising:

a stator having a plurality of magnetic pole portions provided at a side face thereof and arranged in a circumferential direction, and a rotor which is disposed in opposed relation to the magnetic pole portions, and is spaced a predetermined distance from the magnetic pole portions, the rotor including a plurality of rotor cores and permanent magnet groups arranged in the circumferential direction, each of the rotor cores made of magnetic material and each of the permanent magnet groups having at least one permanent magnet, wherein the permanent magnet groups are arranged in such a manner that each permanent magnet has its magnetic polarity oriented in the circumferential direction of the rotor, opposed magnetic poles of any two circumferentially-adjacent permanent magnet groups are of the same magnetic polarity, an axial distance between each permanent magnet and the respective magnetic pole portion along a rotation shaft direction is longer than an axial distance between the respective rotor core and the respective magnetic pole portion along the rotation shaft direction, each permanent magnet includes a stator-facing surface, at least one permanent magnet group and at least one flux barrier are located between circumferentially-adjacent rotor cores, and each flux barrier defines a circumferential width along the stator-facing surface of the respective permanent magnet that is smaller than a circumferential width of the permanent magnet.

3. An axial air gap-type electric motor comprising:

a stator having a plurality of magnetic pole portions provided at a side face thereof and arranged in a circumferential direction, and a rotor which is disposed in opposed relation to the magnetic pole portions, and is spaced a predetermined distance from the magnetic pole portions, the rotor including a plurality of rotor cores and permanent magnet groups arranged in the circumferential direction, each of the rotor cores made of magnetic material and each of the permanent magnet groups having at least one permanent magnet, wherein the permanent magnet groups are arranged in such a manner that each permanent magnet has its magnetic polarity oriented in the circumferential direction of the rotor, opposed magnetic poles of any two circumferentially-adjacent permanent magnet groups are of the same magnetic polarity, an axial distance between each permanent magnet and the respective magnetic pole portion along a rotation shaft direction is longer than an axial distance between the respective rotor core and the respective magnetic pole portion along the rotation shaft direction, each rotor core includes an inner peripheral surface and an outer peripheral surface, and at least one insertion port for the permanent magnets is formed on the inner peripheral surface of each rotor core.

* * * * *